Figure 3:
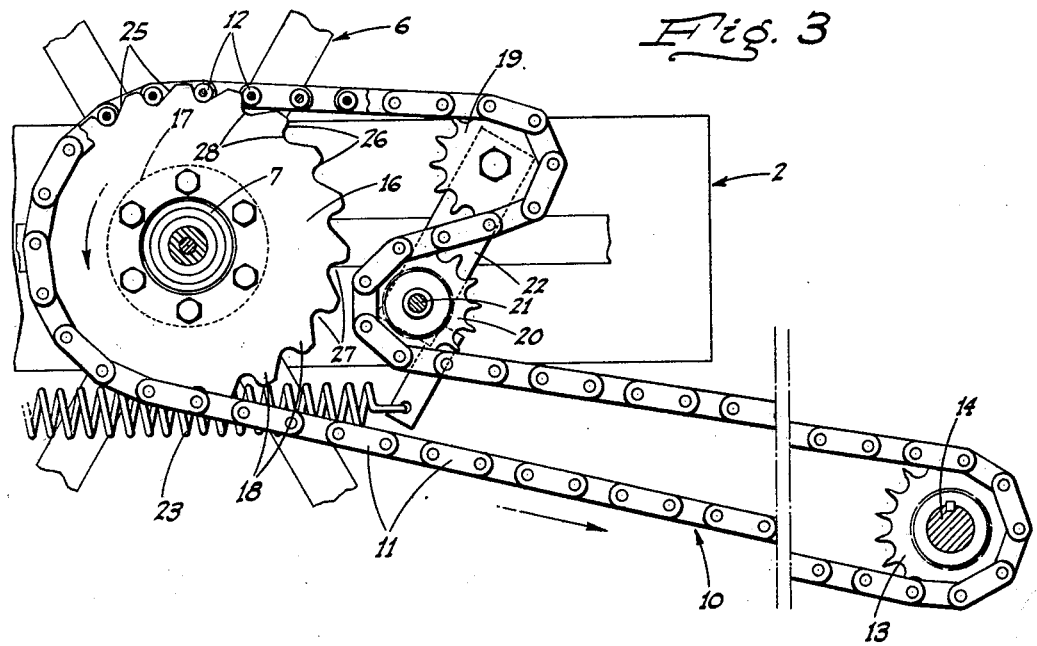

April 28, 1964  L. W. SCHMIDT  3,130,791
ENDLESS CHAIN DRIVE UNIT
Filed Feb. 4, 1963  2 Sheets-Sheet 1
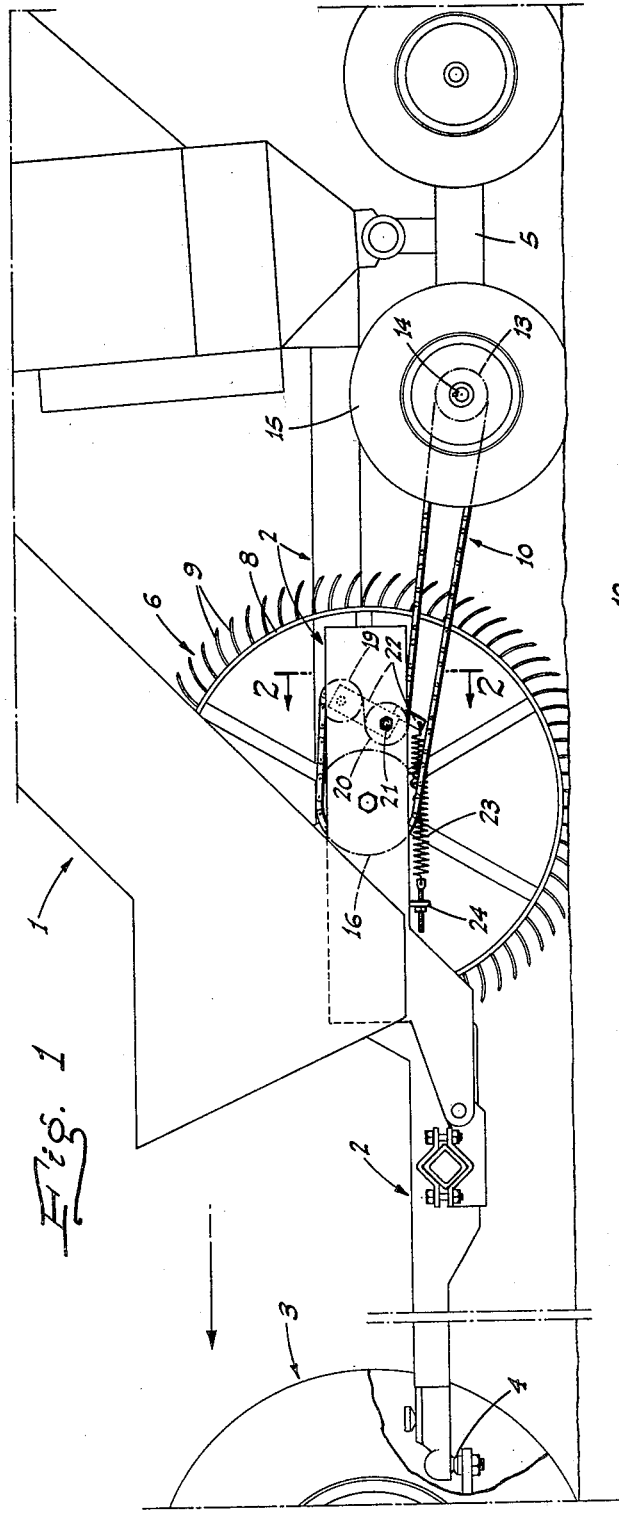
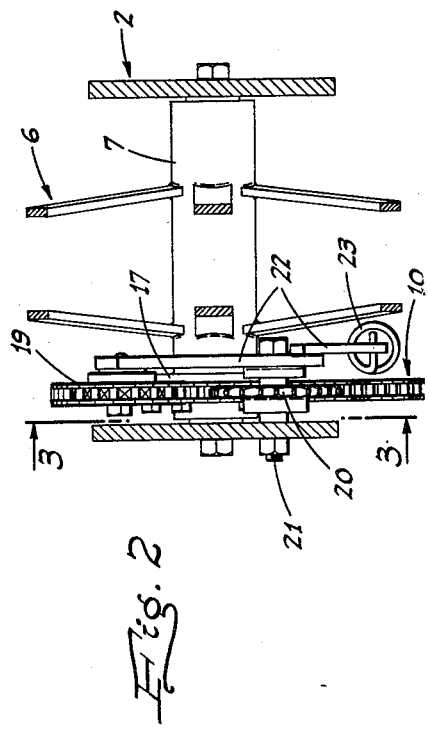
INVENTOR.
Lewis W. Schmidt
BY
Webster & Webster
ATTYS.

April 28, 1964     L. W. SCHMIDT     3,130,791
ENDLESS CHAIN DRIVE UNIT

Filed Feb. 4, 1963     2 Sheets-Sheet 2

United States Patent Office 3,130,791
Patented Apr. 28, 1964

3,130,791
ENDLESS CHAIN DRIVE UNIT
Lewis Wallace Schmidt, Rio Vista, Calif., assignor of sixteen percent to Lloyd K. Schmidt, Isleton, sixteen percent to Albert M. Jongeneel, ten percent to George C. Gordon, ten percent to Ernest F. Blackwelder, and sixteen percent to Lewis Wallace Schmidt, Rio Vista, sixteen percent to Claude A. Loucks, Sonoma, and eight percent to Jessie Newell, Palo Alto, Calif., one and one-third percent to Pliny G. Holt, Washington, D.C., one and one-third percent to Frank H. Holt, Alexandria, Va., and one and one-third percent to Richard E. Holt, Stockton, one and one-third percent to Harriet H. Shelton, Los Gatos, and one and one-third percent to Frank A. Guernsey and one and one-third percent to Darius A. Guernsey, Sherman Oaks, Calif.
Filed Feb. 4, 1963, Ser. No. 255,945
7 Claims. (Cl. 171—53)

This invention relates to an endless chain drive unit, and particularly to one primarily designed for rotating the beet pick-up wheel of a beet harvester as such harvester is drawn along the ground; such wheel being provided with beet engaging spikes whereby the beets are impaled and then lifted from the ground.

In connection with such a pick-up wheel, it has been found desirable to rotate the same at a peripheral speed slower than the linear speed of movement of the harvester along the ground, and it is one of the objects of this invention to provide a chain drive unit between a ground engaging wheel of the harvester and the pick-up wheel whereby the relatively slower speed of the pick-up wheel will be obtained irrespective of the speed of advancing movement of the harvester.

At times, however, the spikes of the pick-up wheel are liable to encounter under-ground obstructions or resistance of one form or another which would tend to cause such wheel to rotate at ground speed instead of at the normal relatively slower speed. The chain drive unit includes a chain-engaging sprocket, and it is another and important object of this invention to construct said sprocket, and arrange the chain drive as a whole, so that the sprocket will automatically overrun the chain whenever the pick-up wheel—to which such sprocket is secured—tends to turn at ground speed rather than such normal relatively slower speed. Such a feature obviously prevents the damage which would otherwise almost unavoidably be done to the spikes, the chain, or some other part of the unit.

Another object of the invention is to provide a practical, reliable, and durable endless chain drive unit, and one which will be exceedingly effective for the purpose for which it is designed.

These objects are accomplished by means of such structure and relative arrangement of parts as will fully appear by a perusal of the following specification and claims.

Figure 4:
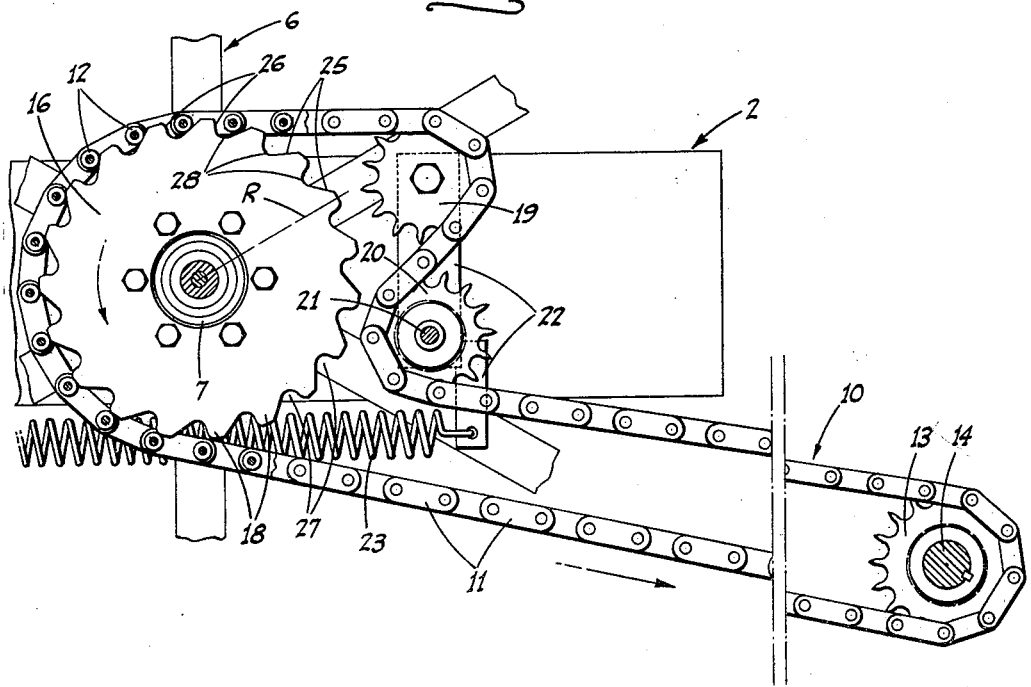

In the drawings:
FIG. 1 is a fragmentary side outline of a beet harvester of the spiked, beet pick-up wheel type, showing the improved endless chain drive unit for said wheel.
FIG. 2 is a fragmentary enlarged cross section on line 2—2 of FIG. 1.
FIG. 3 is an enlarged foreshortened side elevation, taken on line 3—3 of FIG. 2, of the improved wheel drive unit, showing the drive chain in its normal operating position on the driven sprocket; said chain being partly broken out and partly in section.
FIG. 4 is a similar view, but shows the drive chain in its relationship to the driven sprocket when the latter tends to overrun the chain.

Referring now more particularly to the drawings, and to the characters of reference marked thereon, the beet harvester, indicated generally at 1, includes a longitudinal frame structure 2, which at its forward end is supported by a tractor 3 in draft relation thereto, as indicated at 4. At its rear end the frame structure 2 is supported by a wheeled truck 5. A short distance ahead of the truck 5 a spiked, beet pick-up wheel 6 is journaled in the frame structure; said wheel including a hub 7 and a peripheral band 8 from which the beet pickup spikes 9 project.

The improved drive means for the wheel 6, and which forms the subject matter of this invention, comprises an endless drive chain 10 which includes links 11 and evenly spaced sprocket engaging rollers 12 between the side plates of the links, as usual. The chain 10 is trained about a rear drive sprocket 13 which is fixed on the axial shaft 14 of one of the front wheels 15 of the truck 5. The chain is also trained about a forward and larger driven sprocket 16 which is bolted to a flange 17 on the hub 7 of the wheel 6; the teeth 18 of sprocket 16 being of special form, as will be described later.

The sizes of the sprockets 13 and 16 relative to each other and to the wheels 15 and 6, respectively, are such that the peripheral speed of the wheel 6 will normally be substantially 30% slower than the ground or linear speed of the harvester.

The lower driving run of chain 10 extends straight between the sprockets 13 and 16, while the upper return run of said chain is relatively long. Intermediate the sprockets 13 and 16, and preferably relatively close to the latter, the upper return run of the chain 10 is trained about the rear side of an idler sprocket 19, and then about the forward side of a lower direction-changing idler sprocket 20. The axial shaft 21 of the sprocket 20 is mounted in the frame structure 2, while the sprocket 19 is mounted on the upper end of an arm 22 which intermediate its ends is swingably mounted on shaft 21. The lower end of the arm 22 is connected to one end of a tension spring 23 which extends forwardly, and at its forward end is anchored on the frame structure 2 for tensional adjustment, as shown at 24 in FIG. 1. This arrangement, as will be evident, provides a yieldable tensioning means for the drive chain 10, and the particular value of which in the present instance will shortly be explained.

The teeth 18 of the sprocket 16 are of generally ratchet form, facing in the direction opposite the direction of driven rotation of the sprocket 16 and wheel 6, as indicated by the arrows in FIGS. 3 and 4. Thus, while the leading face 25 of each tooth slopes at an angle of substantially 45 degrees to a line R radially of the sprocket 16 and projecting through said tooth, the trailing face 26 of said tooth is substantially parallel to said line R, as shown. A roller 12 of the chain 10 engages in the space 27 thus formed between adjacent teeth 18; the adjacent faces 25 and 26 of said adjacent teeth curving into each other at the bottom, as at 28, to provide a rounded seat for a chain roller 12.

*Operation*

As the harvester advances and as long as the pick-up wheel 6 does not encounter any excessive resistance, it will continue to rotate at its normal slower peripheral speed relative to the ground speed of the harvester. If, however, the ground engaging beet pick-up spikes 9 encounter an under-ground obstruction, or excessively hard ground so that the wheel 6 tends to rotate at ground speed rather than at its normal relatively slower speed, the angled faces 25 of the teeth 18 of the then faster moving sprocket 16 force the tooth-engaging rollers 12 of the slower moving chain 10 out of the sprocket spaces 27, as shown in FIG. 4; the sprocket 16 then overrunning such chain, and which prevents damage which otherwise would occur.

With such movement of the chain rollers 12 radially out from the sprocket spaces 27, and attendant overrunning of the sprocket 16 as described above, the amount of chain then embracing said sprocket 16 is obviously increased in length. This difference in length is compensated for by the accompanying movement of the sprocket 19 toward the sprocket 16 against the resistance of the spring 23. The spring 23 tends of course to pull the sprocket 19, and the topmost portion of the chain 10, rearwardly so as to restore the chain to its normal driving relation with sprocket 16 when the resistance to the rotation of the wheel 5 at its normal relatively slower speed has been overcome.

It may here be noted that while the endless chain drive unit above described has been particularly designed for use in connection with the spiked, pick-up wheel of a beet harvester, it may also be employed as an overrunning or ratchet clutch device for use in various other machines.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a beet harvester adapted to be drawn along the ground and having a ground-engaging supporting wheel and a spiked beet pick-up wheel, a drive unit between the ground engaging wheel and the pick-up wheel, and means formed with the unit to normally rotate the latter at a predetermined slower peripheral speed than the ground speed of the harvester; the drive unit including means to enable the pick-up wheel to be independently rotated from the ground at a speed faster than said predetermined peripheral speed.

2. In a beet harvester, as in claim 1, the last named means including an endless chain and sprocket in normal engagement, and relatively overrunning means therebetween functioning when the pick-up wheel is independently rotated at said faster speed.

3. In a beet harvester, as in claim 1, in which the last named means includes a wheel driving sprocket on the pick-up wheel, and an endless chain in normal driving engagement with the sprocket; the latter including teeth shaped to overrun the chain when the pick-up wheel is independently rotated at said faster speed.

4. In a beet harvester, as in claim 1, wherein the drive unit includes a sprocket driven from the ground engaging wheel, another sprocket in driving connection with the pick-up wheel, and an endless chain extending between such sprockets; said other sprocket including chain engaging teeth formed to overrun the chain upon the pick-up wheel being independently rotated from the ground at a speed faster than said predetermined peripheral speed.

5. A chain drive unit comprising a drive sprocket and a driven sprocket, an endless chain trained about and extending between the sprockets to drive the driven sprocket at a predetermined speed relative to that of the drive sprocket, the drive chain including spaced rollers and the driven sprocket having teeth spaced to receive the rollers therebetween; the teeth being ratchet shaped and facing in the direction opposite the direction of rotation of the driven sprocket so that the rollers will ride out of the tooth spaces and the driven sprocket will overrun the chain when said driven sprocket is rotated at a speed faster than said predetermined speed.

6. A chain drive unit, as in claim 5, in which the driving run of the chain extends straight between the sprockets and the return run of said chain is relatively long, and a yieldable chain tensioning device interposed in said return run and arranged to maintain the same in a normally relatively contracted but extensible condition.

7. A chain drive unit, as in claim 6, in which said device comprises a pair of idler sprockets disposed in spaced relation to each other and to the driving run of the chain, means mounting one idler sprocket in a fixed position between the drive and driven sprockets, means mounting the other idler sprocket for swinging movement about the axis of said one sprocket, said return chain run after leaving the driven sprocket being trained about the side of said other idler sprocket furthest from the driven sprocket and being then trained about the side of the one sprocket nearest the driven sprocket and extending thence to the drive sprocket, and a spring yieldably acting on said idler sprocket mounting means to swing the latter in a direction to move said other idler sprocket away from the driven sprocket.

References Cited in the file of this patent

UNITED STATES PATENTS

| | | |
|---|---|---|
| 2,563,030 | Gomes | Aug. 7, 1951 |
| 2,697,318 | Gomes | Dec. 21, 1954 |
| 2,935,137 | Schmidt | May 3, 1960 |